United States Patent
Kim et al.

(10) Patent No.: US 8,240,575 B2
(45) Date of Patent: *Aug. 14, 2012

(54) METHOD OF MULTI-INTERFACING BETWEEN SMART CARD AND MEMORY CARD, AND MULTI-INTERFACE CARD

(75) Inventors: Kyoung-Hun Kim, Suwon-si (KR); Seong-Hyun Kim, Yongin-si (KR); Jong-Hoon Shin, Suwon-si (KR); Yong-Joo Park, Seoul (KR); Zang-Hee Cho, Suwon-si (KR); Jong-Sang Choi, Seoul (KR); Jeon-Taek Im, Anseong-si (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 554 days.

This patent is subject to a terminal disclaimer.

(21) Appl. No.: 12/424,253

(22) Filed: Apr. 15, 2009

(65) Prior Publication Data

US 2009/0200368 A1    Aug. 13, 2009

Related U.S. Application Data

(63) Continuation of application No. 11/212,505, filed on Aug. 26, 2005, now Pat. No. 7,520,438.

(30) Foreign Application Priority Data

Aug. 26, 2004  (KR) .................................. 2004-67455

(51) Int. Cl.
*G06K 19/06* (2006.01)
(52) U.S. Cl. ....................................... 235/492; 235/486
(58) Field of Classification Search .................. 235/492, 235/486, 487, 449, 493
See application file for complete search history.

(56) References Cited

U.S. PATENT DOCUMENTS

| 5,787,101 | A  | * | 7/1998  | Kelly ............................ 714/800 |
| 7,520,438 | B2 | * | 4/2009  | Kim et al. ..................... 235/492 |
| 2002/0178307 | A1 | * | 11/2002 | Pua et al. ....................... 710/62 |
| 2003/0046567 | A1 | * | 3/2003  | Carman ........................ 713/193 |
| 2003/0112613 | A1 |   | 6/2003  | Nishizawa et al. |
| 2007/0158439 | A1 | * | 7/2007  | Conner et al. ................ 235/492 |

FOREIGN PATENT DOCUMENTS

| JP | 1997-134573 | 5/1995 |
| JP | 2004-185242 | 7/2004 |
| WO | WO 01/84490 a1 | 4/2009 |

OTHER PUBLICATIONS

English Abstract for Publication No. 2004-185242.
English Abstract for Publication No. 1997-134573.

* cited by examiner

*Primary Examiner* — Thien M Le
(74) *Attorney, Agent, or Firm* — F. Chau & Associates, LLC (57) ABSTRACT

A multi-interface card includes smart card interface, memory card interface, card controller and memory module. The smart card interface interfaces with a smart card host using a smart card protocol. The memory card interface interfaces with a memory card host using a memory card protocol. The card controller controls the smart card host and memory card host so that the smart card host and the memory card host simultaneously interface with the smart card and the memory card interfaces, respectively. The memory module stores data transferred from the smart card host and memory card host. The multi-interface card simultaneously supports the smart card interface and the memory card interface. Thus, the one multi-interface card can support a subscriber authentication function and a data storage function.

20 Claims, 10 Drawing Sheets

METHOD OF MULTI-INTERFACING BETWEEN SMART CARD AND MEMORY CARD, AND MULTI-INTERFACE CARD

CROSS-REFERENCE TO RELATED APPLICATION

This is a Continuation application of U.S. application Ser. No. 11/212,505 filed on Aug. 26, 2005, now U.S. Pat. No. 7,520,438 which claims priority to Korean Patent Application No. 2004-67455, filed on Aug. 26, 2004 in the Korean Intellectual Property Office (KIPO), the disclosures of which are herein incorporated by reference in their entirety.

BACKGROUND OF THE INVENTION

1. Technical Field

The present invention relates to a multi-interface card, and more particularly to a multi-interface case in which a smart card and a memory card are implemented, and a method of interfacing between the smart card and the memory card.

2. Discussion of Related Art

A smart card, for example a SIM (Subscriber Identification Module) card, may be coupled to a mobile phone, wherein the SIM card includes subscriber information such as subscriber's phone number and an authentication identification for enabling the mobile phone. The subscriber can use the mobile phone when the SIM card is coupled to the mobile phone.

The mobile phone needs to use both a SIM card for performing an authentication operation, and a memory card for storing multimedia data.

When the SIM card and at least one memory card are used in the mobile phone at the same time, the SIM card and the memory card are separately coupled to the mobile phone.

The SIM card and the memory card may operate at different clock rates. For example, the SIM card operates at a low clock rate, such as about 5 MHz, and the memory card operates at a high clock rate, such as about 20 MHz.

In addition, a SIM card host and a memory card host operate independently each other. The SIM card host and the at least one memory card host may adopt different power supply voltages, the power supply voltages of the SIM card host and the memory card host may be independently turned off, and may be simultaneously turned on. In addition, a reset request may be independently generated by the SIM card host or by the memory card host.

The multi-interface card cannot provide functionality for simultaneous access to the SIM card host and the memory card host. More particularly, the multi-interface card cannot simultaneously support the SIM card interface and the memory card interface operating at different clock rates.

When a plurality of interfaces are implemented, the multi-interface card cannot sense whether power supply voltages of the card hosts are turned off or on, whether the clocks of card hosts are stopped or running, or whether reset requests of the card hosts are activated or deactivated. Thus the multi-interface card cannot manage the multi-interface card system.

Therefore, a need exists for a multi-interface card supporting a smart card and a memory card.

SUMMARY OF THE INVENTION

According to an embodiment of the present invention, a multi-interface card includes a smart card interface configured to interface with a smart card host using a smart card protocol, a memory card interface configured to interface with at least one memory card host using a memory card protocol, a card controller configured to control the smart card host and the at least one memory card host so that the smart card host and the at least one memory card host may simultaneously interface with the smart card interface and the memory card interface, respectively, and a memory module configured to store data transferred from the smart card host and the at least one memory card host.

According to an embodiment of the present invention, a multi-interface card includes a first card interface configured to interface with a first card host having an authentication function, a second card interface configured to interface with at least one second card host having a data storage function, a memory module configured to store data transferred from the first card host and the at least one the second card host, and a card controller configured to monitor each clock signal, each power voltage or each reset signal of both the first card host and the at least one of the second card hosts, and configured to control the each clock signal, the each power voltage or the each reset signal.

According to an embodiment of the present invention, a method of multi-interfacing between a smart card and a memory card includes receiving a first request or a first memory use request from a smart card host through a smart card interface, receiving a second request or a second memory use request from at least one memory card host through a memory card interface, prioritizing the first request, the second request, the first memory use request and the second memory use request based on a condition of a normal operation defined in a smart card protocol and a memory card protocol, performing operations corresponding to the first request and the second request based on the priority, and providing the first memory use request and the second memory use request to a memory module based on the priority.

BRIEF DESCRIPTION OF THE DRAWINGS

The present invention will become more apparent by describing in detail embodiments thereof with reference to the accompanying drawings, in which.

DETAILED DESCRIPTION OF PREFERRED EMBODIMENTS

Detailed illustrative embodiments of the present invention are disclosed herein. This invention may, however, be embodied in many alternate forms and should not be construed as limited to the embodiments set forth herein. Like numbers refer to like elements throughout the description of the figures.

Figure 1:
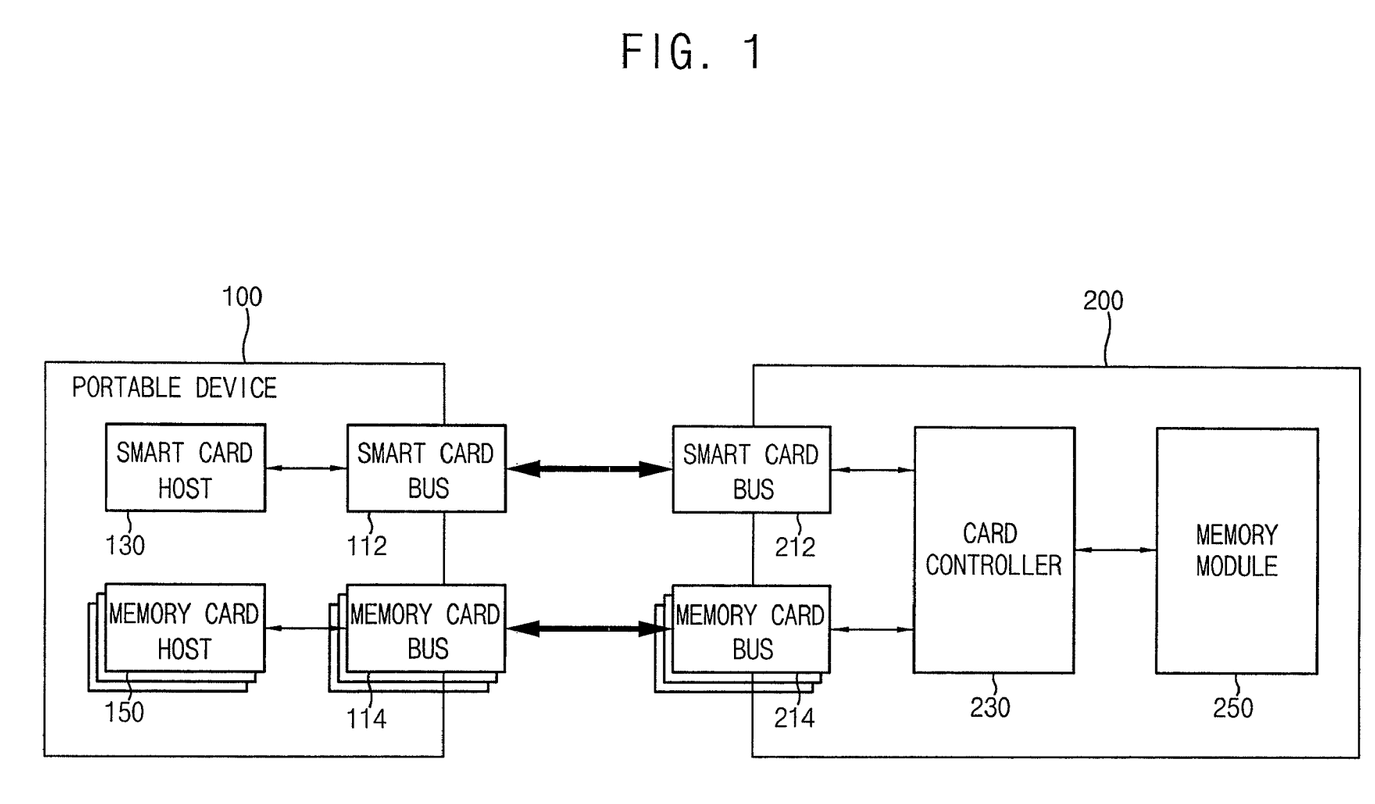
FIG. 1 is a block diagram illustrating a multi-interface card according to an embodiment of the present invention.

FIG. 1 is a block diagram illustrating a multi-interface card 200 according to an embodiment of the present invention.

The multi-interface card 200 includes a first interface with a smart card host 130 and a second interface with at least one memory card host 150. The smart card host 130 and the memory card host 150 are implemented in one device 100.

For example, the smart card host 130 and the at least one memory card host 150 may be installed in a portable device 100 such as a mobile phone.

For example, the smart card host 130 is a SIM (Subscriber Identification Module) card. The SIM card stores a telephone number of the subscriber and a PIN (Personal Identification Number), and is used for an authentication.

The memory card host 150 may be, for example, a MMC (Multi Media Card), a Secure Digital (SD) card, a Memory Stick® card, a CompactFlash® card or a Smart Media® card.

A single memory card or a plurality of the memory cards may be installed in the portable device 100.

For example, the SIM card host for authentication and the single MMC host for data storage may be installed in the portable device.

Alternatively, the SIM card for authentication and a plurality of memory card hosts, such as a MMC host, a SD card host and a Memory Stick® card host for data storage, may be installed in the portable device 100.

Referring to FIG. 1, a portable device 100 includes a smart card host 130, a smart card bus 112, at least one memory card host 150 and a memory card bus 114.

The multi-interface card 200 includes a smart card bus 212, a memory card bus 214, a card controller 230 and a memory module 250.

The memory card bus 114 and 214 may include either one bus or a plurality of buses depending upon a type and the number of the memory card hosts 150.

The smart card host 130 and the multi-interface card 200 communicate with each other through the smart card bus 112 and 212 by adopting a contact-type smart card standard such as the ISO 7816 protocol specification.

The smart card interface for authentication should respond to an authentication request within a predetermined time period.

The memory card interface for high capacity storage operates at a high speed so as to process a desirable number of data packets.

The smart card host 130 operates at a relatively low clock rate of about 5 MHz, and the memory card host 150 operates at a relatively high clock rate of about 20 MHz.

For example, the smart card host 130 operates at a clock rate of about 3.25 MHz, and at least one memory card host 150 operates at a clock rate of about 20 MHz, 25 MHz or 52 MHz.

The card controller 230 controls an interface between the smart card host 130 operating at a relatively low clock rate of about 5 Mhz and a SIM card, and controls an interface between at least one memory card host 150 operating at a relatively high clock rate more than about 20 Mhz and at least one memory card. The SIM card and the at least one memory card communicate using a different protocol from each other.

The card controller 230 includes a clock manager, a power manager, a reset manager, and a memory/protocol arbiter. The card controller 230 simultaneously supports the multi-interface between the smart card host 130 operating at a relatively low clock rate and at least one memory card host 150 operating at a relatively high clock rate by managing clock signals, power signals, reset signals, which are provided from a plurality of card host, and by managing an internal memory and an external memory.

The memory module 250 may be, for example, a SRAM (Static Random Access Memory), a flash memory, a MRAM (Magneto-resistive Random Access Memory), a FRAM (Ferro-electric Random Access Memory), a PRAM (Phase-change Random Access Memory) or an EEPROM (Electrically Erasable Programmable Read Only Memory).

The memory module 250 stores multi-media data and/or authentication data.

Figure 2:
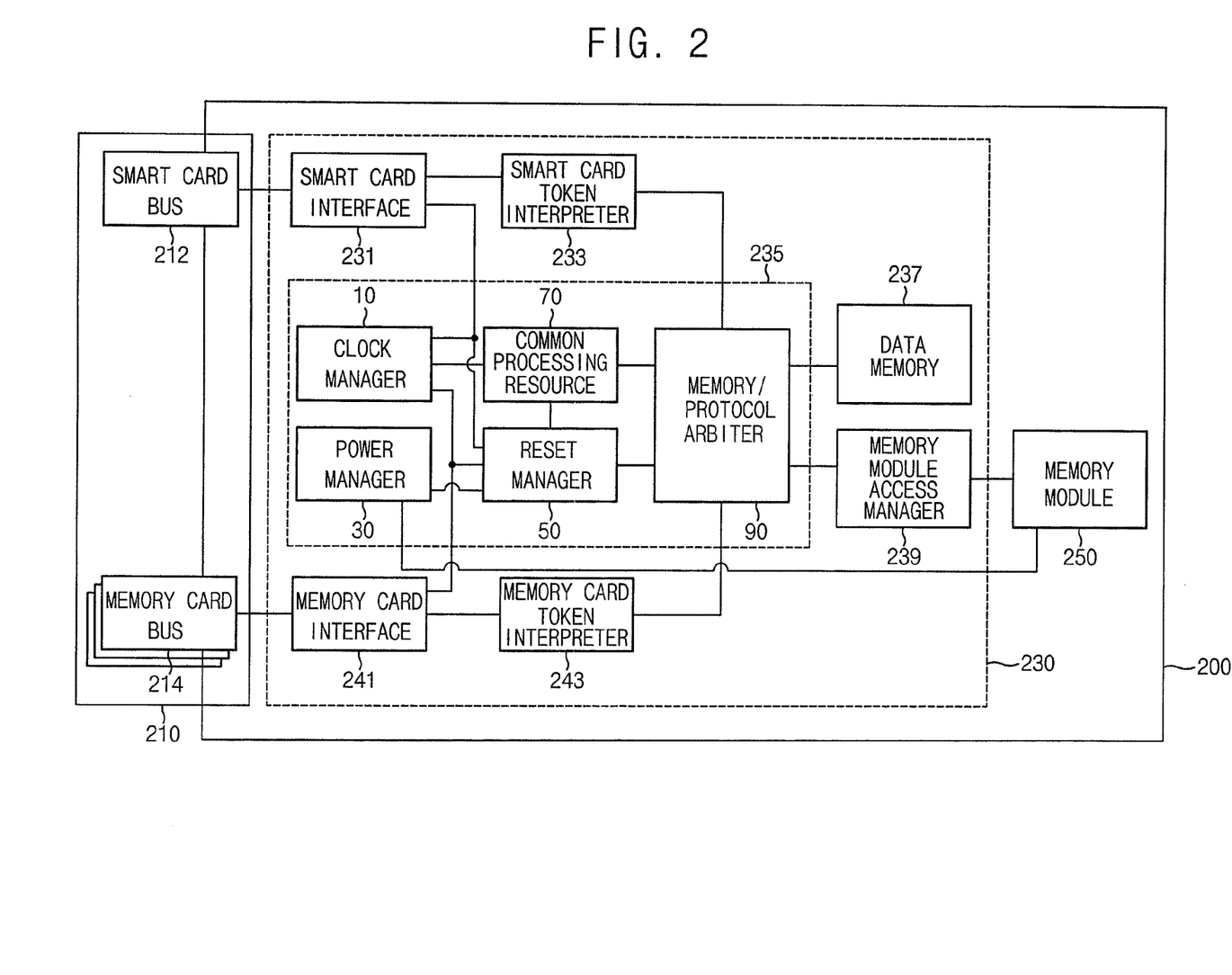
FIG. 2 is a block diagram illustrating a card controller of FIG. 1 according to an embodiment of the present invention.

The memory module 250 may be outside of the card controller 230 as shown in FIG. 2. Alternatively, the memory module 250 may be included in the card controller 230.

FIG. 2 is a block diagram illustrating a card controller 230 of FIG. 1 according to an embodiment of the present invention.

Referring to FIG. 2, the card controller 230 includes a smart card interface 231, a smart card token interpreter 233, a card manager 235, a memory module access manager 239, a memory card interface 241 and a memory card token interpreter 243.

The card controller 230 may further include a data memory 237. The data memory 237 may be included in the card controller 230, or alternatively may be disposed outside of the card controller 230.

The smart card interface 231 physically and functionally interfaces with the smart card host 130 through the smart card bus 112 and 212 based on a contact-type smart card standard such as the ISO 7816 specification.

Alternatively, the smart card interface 231 may provide an interface with the smart card host 130 based on a contactless-type smart card standard such as the ISO 14443 protocol specification.

The smart card token interpreter 233 receives requests that are transferred from the smart card host 130 through the contact-type smart card standard.

The smart card token interpreter 233 converts the requests to tokens for a data access, a data control and a data process so that an application related to the requests may be executed.

An example of the application is an authentication process, etc.

The card manager 235 includes a clock manager 10, a power manager 30, a reset manager 50 and a memory/protocol arbiter 90.

The memory/protocol arbiter 90 may be divided into a protocol arbiter and a memory control arbiter.

The clock manager 10 controls clock signals of the card controller 230 so as not to affect entire operations of the multi-interface card 200 and so as to reduce system power consumption. For example, the clock manager 10 controls clock signals of the card controller 230 when the clock signals are applied to the clock manager 10 from both the SIM card host 130 and at least one memory card host 150, or when at least one clock signal of the SIM card host 130 and at least one memory card host 150 is deactivated, or when at least one clock signal of the SIM card host 130 and at least one memory card host 150 is applied to the clock manager 10.

The power manager 30 manages power voltages so as not to affect entire operations of the multi-interface card 200 when the power voltages of both the SIM card host 130 and at least one memory card host 150 are turned off at the same time, or when the power voltages of both the SIM card host 130 and at least one memory card host 150 are turned on at the same time.

The reset manager 50 performs a reset operation so as not to affect entire operations of the multi-interface card 200 when the reset manager 50 receives a reset request, a warm reset request or a cold reset request from each of the SIM card host 130 and at least one memory card host 150.

The memory/protocol arbiter 90 simultaneously or individually receives a plurality of requests or a plurality of memory use requests from the SIM card host 130 and at least one memory card host 150.

The memory/protocol arbiter 90 interprets the plurality of requests or the plurality of memory use requests using the smart card token interpreter 233 and the memory card token interpreter 243, determines a priority of the plurality of requests or the plurality of memory use requests based on a response time, for an operation that is defined in the SIM card protocol specification or the memory card protocol specification.

The common processing resource 70 includes a processor, a bus, a data engine and an I/O device that are used for processing requests of the plurality of card hosts.

The memory card interface 241 provides physical and functional interfaces with the memory card host 150 through the memory card bus 114 and 214 based on one of a plurality of memory card bus protocols—for example, a bus protocol such as that for the MMC, SD card or the Memory Stick® card.

The memory card token interpreter 243 converts the requests to a token(s) for a data access and a data control so that an application related to the requests, which are transferred from the memory card host 150 based on the one of the plurality of memory card bus protocol, is executed.

An example of the application is a memory storing process.

The data memory 237 includes, for example, an SRAM, a flash memory, a PRAM, an FRAM and/or an EEPROM.

The data memory 237 stores data generated by an internal process of the multi-interface card 200.

Additionally, the data memory 237 may store data related to an authentication process.

The memory module access manager 239 allows access to the memory module 250 in response to a memory access request selected by the memory/protocol arbiter 90 among memory access requests provided from one of the plurality of the memory card hosts 150.

When one of the plurality of memory card hosts 150 accesses the memory module 250 that is implemented using, for example, the flash memory, the SRAM, and/or the EEPROM, the memory module access manager 239 converts a memory address provided by one of the plurality of memory card hosts 150 to an address suitable for the flash memory, the SRAM and/or the EEPROM.

For example, the multi-interface card 200 may be implemented on a single chip. Alternatively, the multi-interface card 200 may be implemented on multiple chips, for example, wherein the card manager block 235 is implemented on a single chip, the smart card interface 231 and the smart card token interpreter 233 are implemented on another single chip, and at least one memory card interface 241 and the memory card token interpreter 243 is implemented on still another single chip.

Figure 3:
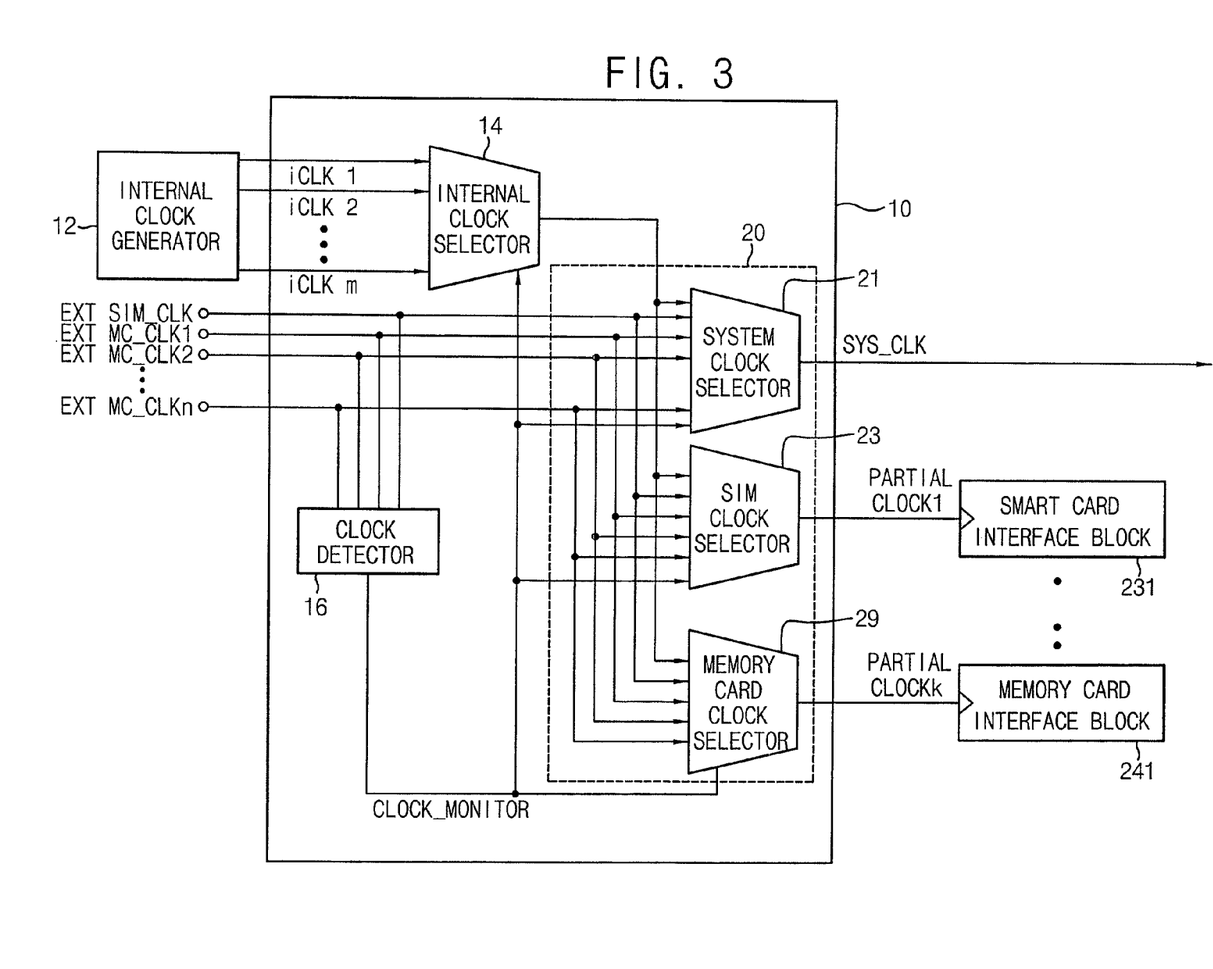
FIG. 3 is a block diagram illustrating a clock manager of the card controller shown in FIG. 2 according to an embodiment of the present invention.

FIG. 3 is a block diagram illustrating a clock manager of the card controller shown in FIG. 2 according to an embodiment of the present invention.

Referring to FIG. 3, the clock manager 10 includes an internal clock selector 14, a clock detector 16 and a clock selector 20.

The clock selector 20 includes a system clock selector 21, a SIM clock selector 23 and a memory card clock selector 29.

The clock manager 10 selects one clock among clock signals iCLK_1 through iCLK_m, SIM_CLK, and Ext CLK 1 through Ext CLK n provided from a plurality of clock sources such as an internal clock generator 12, the SIM card host 130 and at least one memory card host 150 in response to a clock control signal.

The SIM_CLK clock signal is provided from the SIM card host 130, the Ext CLK 1 through the Ext CLK n clock signals are provided from each of the plurality of the memory card hosts 150.

The clock control signal includes, for example, a clock monitor signal (Clock_Monitor) and state information of the card controller 230.

The state information of the card controller 230 includes a sleeping mode, an operation mode and a stop mode.

For example, the card controller 230, during the sleeping mode, operates at a relatively low system clock rate so as to reduce power consumption.

During the stop mode, power voltages of the smart card host 130 and the memory card host 150 are powered on and the system clock is inactivated.

The clock control signal may further include a power monitor signal (Power_Monitor), a reset monitor signal (Reset_Monitor) and an internal clock control signal.

The clock manager 10 provides the selected clock signal to the multi-interface card 200 as the system clock SYSTEM CLOCK, or to the smart card interface block 231 or the memory card interface block 241.

The system clock SYSTEM CLOCK is a clock signal used in the common processing resource 70 that uses a system bus of the multi-interface card 200.

The internal clock generator 12 generates internal clocks iCLK 1 through iCLK m to provide the internal clocks iCLK 1 through iCLK m to the internal clock selector 14.

For example, the internal clock generator 12 includes an oscillator. For example, the internal clock generator 12 may generate only one internal clock iCLK.

The internal clock iCLK may have a relatively high clock rate of about 20 MHz, about 25 MHz, or a relatively low clock rate of about 3.25 MHz.

The internal clock selector 14 selects one of the internal clocks iCLK 1 through iCLK m generated from the internal clock generator 12 in response to the CLOCK_MONITOR signal, and outputs the selected internal clock iCLK.

The internal clock selector 14 may select one of the internal clocks iCLK 1 through iCLK m generated from the internal clock generator 12 in response to the CLOCK_MONITOR signal and/or the state information of the card controller 230.

The system clock selector 21 selects one clock signal, among the internal clock signal iCLK, SIM_CLK signal and the Ext CLK 1 through Ext CLK n, as the system clock signal based on the clock control signal.

Additionally, the system clock selector 21 deactivates the system clock signal or selects the system clock signal as a high or a low rate clock based on the state information of the card controller 230 and/or the CLOCK_MONITOR signal.

The system clock selector 21 selects the internal clock signal of the internal clock selector 14 as the system clock SYSTEM CLOCK.

When both the SIM card clock signal of about 3.25 MHz and the memory card clock signal of about 20 MHz are activated, the system clock selector 21 may select the internal clock signal of around 20 MHz outputted from the internal clock selector 14 as the system clock SYSTEM CLOCK. In such case, the system clock selector 21 may also select the memory card clock signal of about 20 MHz as the system clock SYSTEM CLOCK.

For example, when both the SIM card clock signal, having a relatively low rate about 3.25 Mhz, and the memory card clock signal, having a relatively high rate about 52 Mhz, are activated, the system clock selector 21 selects the internal clock signal of about 25 Mhz between 3.25 Mhz and 52 Mhz provided from the internal clock selector 14 as the system clock signal SYSTEM CLOCK.

When the memory card clock signal of about 20 MHz is activated and the SIM card clock signal, having a relatively low clock rate, is deactivated, the system clock selector 21 may select either the memory card clock signal having a high rate 20 MHz or the internal clock having the high rate 20 MHz as the system clock SYSTEM CLOCK.

When only the low rate 3.25 Mhz SIM card clock is changed to an active state from an inactive state, while both low rate 3.25 Mhz SIM card clock and the high rate 20 Mhz memory card clock are in a deactivated state, the system clock selector 21 selects the low rate 3.25 Mhz SIM card clock signal as the system clock SYSTEM CLOCK or selects the internal clock corresponding to the clock rate of the SIM card clock signal as the system clock SYSTEM CLOCK.

For example, when the card controller 230 is changed to the sleeping mode, while both the low rate 3.25 Mhz SIM card clock and the high rate 20 Mhz memory card clock are in a deactivated state, the system clock selector 21 selects the low rate 3.25 Mhz SIM card clock signal as the system clock SYSTEM CLOCK.

The SIM card clock selector 23 selects one clock signal based on the clock control signal among the selected internal clock signal, the SIM_CLK, the Ext CLK 1 through the Ext CLK n, and generates a partial CLOCK 1 signal, providing the partial CLOCK 1 signal to the smart card interface block 231 for interfacing with the SIM card host 130.

Alternatively, the SIM clock selector 23 may receive only the SIM_CLK signal to provide the SIM_CLK signal as the partial CLOCK 1 signal to the smart card interface block 231 based on the clock control signal.

For example, when the SIM_CLK signal having an active state is detected by the CLOCK_MONITOR signal, the SIM clock selector 230 selects the SIM_CLK signal to provide the SIM_CLK as the partial CLOCK 1 signal to the smart card interface block 231.

The memory card clock selector 29 selects one clock among the selected internal clock signal, the SIM_CLK signal, the Ext CLK 1 through the Ext CLK n in response to the clock control signal, and generates a partial CLOCK k signal to provide the partial CLOCK k signal to the memory card interface block 241 for interfacing with the memory card host 150.

Alternatively, the memory card clock selector 29 may receive only the Ext CLK signal having the active state detected by the CLOCK_MONITOR signal to provide the Ext CLK signal as the partial CLOCK k to the memory card interface block 241.

The number of the memory card clock signals Ext CLK 1 through Ext CLK n corresponds to a number of memory card clock selectors 29 and memory card interface blocks 241.

For example, when the Ext CLK 1 signal having an active state is detected by the CLOCK_MONITOR signal, the memory card clock selector 29 provides the Ext CLK 1 signal to a corresponding memory card interface block 241.

For example, when the Ext CLK 1 of a first memory card host and the Ext CLK 2 of a second memory card host having active states are detected by the CLOCK_MONITOR signal, the memory card clock selector 29 provides the Ext CLK 1 signal and the Ext CLK 2 signal to each corresponding memory card interface block 241.

The clock detector 16 generates the CLOCK_MONITOR signal by monitoring the SIM_CLK signal and the Ext CLK 1 through the Ext CLK n signals. The CLOCK_MONITOR signal includes information about the state of the SIM_CLK signal and the Ext CLK 1 through the Ext CLK n signals, e.g., whether a signal is activated.

Figure 4:
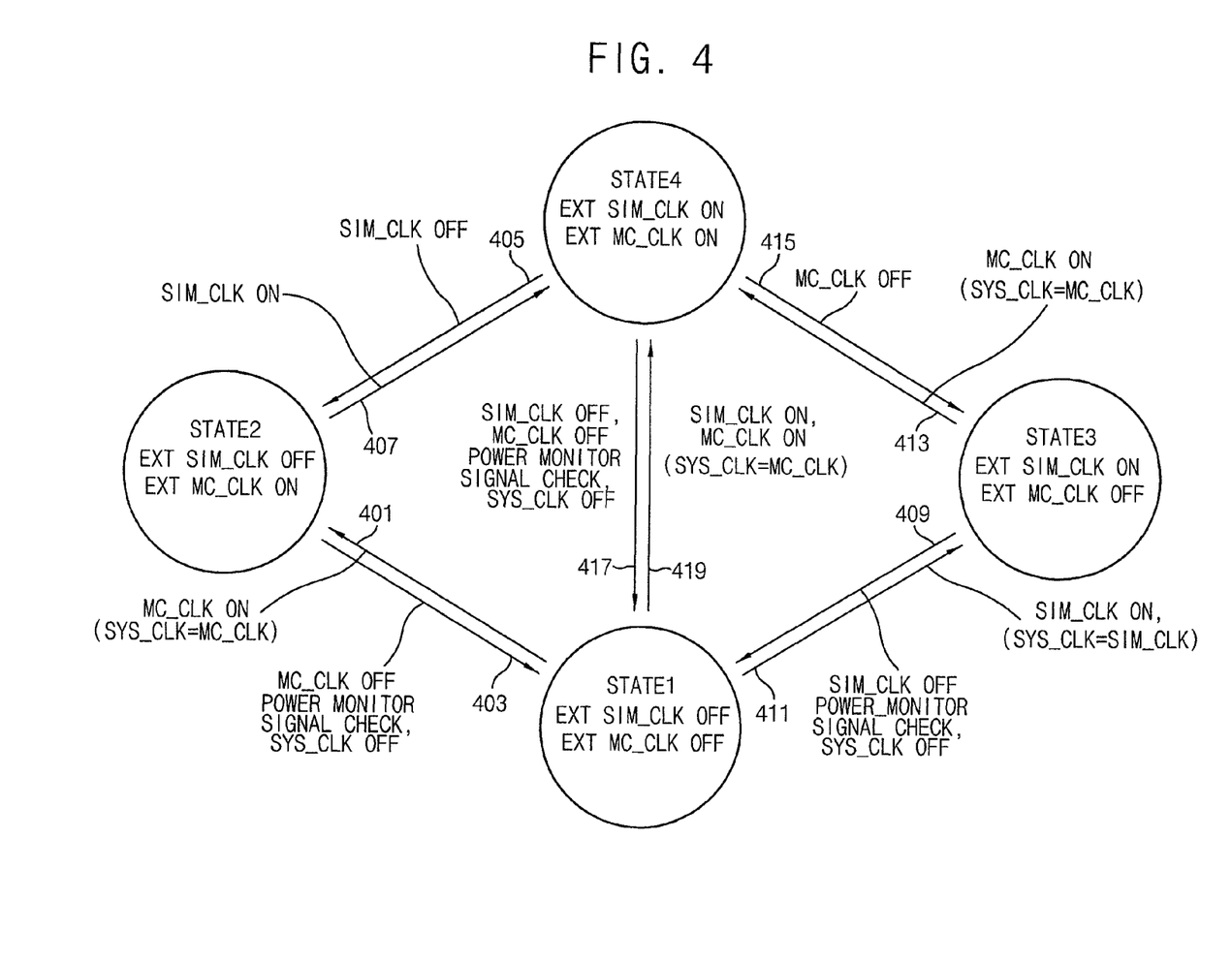
FIG. 4 is a state diagram illustrating operations of the clock manager shown in FIG. 3 according to an embodiment of the present invention.

FIG. 4 is a state diagram illustrating operations of the clock manager 10 shown in FIG. 3 according to an embodiment of the present invention.

The clock manager 10 controls the clock signals of the card controller 230 depending upon whether the clock manager 10 receives the clock signals from both of the SIM card host 130 and at least one memory card host 150 at the same time, or whether at least one clock signal of the SIM card host 130 and at least one memory card host 150 is deactivated.

Hereinafter, operations of the clock manager 10 are now explained with reference to the state diagram shown in FIG. 4.

Referring to FIG. 4, in the state 1, the EXT SIM_CLK signal has an inactive state and the EXT MC_CLK signal has an inactive state.

The EXT SIM_CLK signal is provided from the SIM card host 130 and the EXT MC_CLK signal is provided from the memory card host 150.

In the state 2, the EXT SIM_CLK signal has an inactive state and the EXT MC_CLK signal has an active state.

In the state 3, the EXT SIM_CLK signal has an active state and the EXT MC_CLK signal has an inactive state.

In the state 4, the EXT SIM_CLK signal has an active state and the EXT MC_CLK signal has an active state.

During data transmission, the SIM card host 130 and the memory card host 150 may use a different clock frequency from each other.

The clock signals of the SIM card host 130 and the memory card host 150 are deactivated before the power supply voltage is turned off. Namely, it takes a predetermined time for the power supply voltage to be turned off after the clock signals of the SIM card host 130 and the memory card host 150 are deactivated.

The CLOCK_MONITOR signal includes information about the state of the clock signals provided from the SIM card host 130 or the memory card host 150.

Each of the four states may be changed to another of the four states, and during each transition the system clock SYS_CLK is controlled based on the clock control signal.

For example, during a transition from state 4 to state 3, the clock manager 10 changes a SYS_CLK signal having the high clock rate to a SYS_CLK signal having the low clock rate based on the state information (sleep, normal or stop modes) of the card controller 230 according to a deactivated EXT MC_CLK signal of the memory card host 150.

During a transition from state 1 to state 2, the memory card clock selector 29 of the clock manager 10 selects the activated EXT MC_CLK signal to provide to a corresponding memory card interface block 241 (EXT MC_CLK ON), and when a POR (Power-On-Reset) command is provided from the memory card host 150, the system clock selector 21 selects the activated EXT MC_CLK signal having a high clock rate as the system clock SYS_CLK signal (401).

Conversely, during a transition from state 2 to state 1, the memory card clock selector 29 of the clock manager 10 cuts off the EXT MC_CLK signal outputted from the memory clock selector 29, and the system clock selector 21 verifies (or checks) the POWER_MONITOR signal to cut-off the system clock SYS_CLK signal outputted from the system clock selector 21 when both the power voltage of the memory card host 150 and the power voltage of the SIM card host 130 are deactivated (SYS_CLK OFF; 403).

During a transition from state 1 to state 3, the SIM clock selector 23 of the clock manager 10 selects the activated SIM_CLK signal to be provided to a corresponding SIM card interface block (SIM_CLK ON), and the system clock selector 21 selects the low rate SIM_CLK signal as the system clock SYS_CLK (411).

Conversely, during a transition from state 3 to state 1, the SIM clock selector 23 of the clock manager 10 cuts off the SIM_CLK signal outputted from the SIM clock selector 23 (SIM_CLK OFF), and the system clock selector 21 checks the power monitor signal PWR_MONITOR to determine whether both the power voltage of the memory card host 150 and the power voltage of the SIM card host 130 are off.

When both the power voltage of the memory card host 150 and the power voltage of the SIM card host 130 are off, the system clock selector 21 cuts off the system clock signal SYS_CLK outputted from the system clock selector 21 to deactivate the system clock signal SYS_CLK (409).

During a transition from state 2 to state 4, the SIM clock selector 23 of the clock manager 10 selects the activated SIM_CLK signal to provide to a corresponding SIM card interface block (SIM_CLK ON; 407).

In such case, the high rate memory card clock signal MC_CLK may be continuously used for the system clock signal SYS_CLK.

Conversely, during a transition from state 4 to state 2, the SIM clock selector 23 of the clock manager 10 cuts off the SIM_CLK signal outputted from the SIM clock selector 23 (SIM_CLK OFF; 405). In such case, the high rate memory card clock signal MC_CLK may be continuously used for the system clock signal SYS_CLK.

During a transition from state 4 to state 3, the memory card clock selector 29 of the clock manager 10 cuts off the MC_CLK signal outputted from the memory card clock selector 29 (MC_CLK OFF; 415), and the system clock selector 21 selects the low rate SIM_CLK signal as the system clock SYS_CLK.

Conversely, during a transition from state 3 to state 4, the memory card clock selector 29 of the clock manager 10 selects the activated MC_CLK signal to be provided to a corresponding card interface block 241 (MC_CLK ON), and the system clock selector 21 selects the high rate MC_CLK signal as the system clock signal SYS_CLK (413).

During a transition from state 1 to state 4, the SIM clock selector 23 of the clock manager 10 selects the activated SIM_CLK signal to be provided to a corresponding SIM card interface block 231 (SIM_CLK ON), the memory card clock selector 29 selects the high rate MC_CLK signal to be provided to a corresponding memory card interface block 241 (MC_SLK ON), and the system clock selector 21 selects the high rate MC_CLK signal as the system clock SYSTEM CLOCK(419).

Conversely, during a transition from state 4 to state 1, the SIM clock selector 23 of the clock manager 10 cuts off the SIM_CLK signal outputted from the SIM clock selector 23 (SIM_CLK OFF), the memory card clock selector 29 cuts off the MC_CLK signal outputted from the memory card clock selector 29 (MC_CLK OFF), the system clock selector 21 checks the power monitor signal PWR_MONITOR to determine whether both the power voltage of the memory card host 150 and the power voltage of the SIM card host 130 are off or not.

When both the power voltage of the memory card host 150 and the power voltage of the SIM card host 130 are off, the system clock selector 21 cuts off the system clock signal SYS_CLK outputted from the system clock selector 21 to deactivate the system clock signal SYS_CLK (417).

Figure 5:
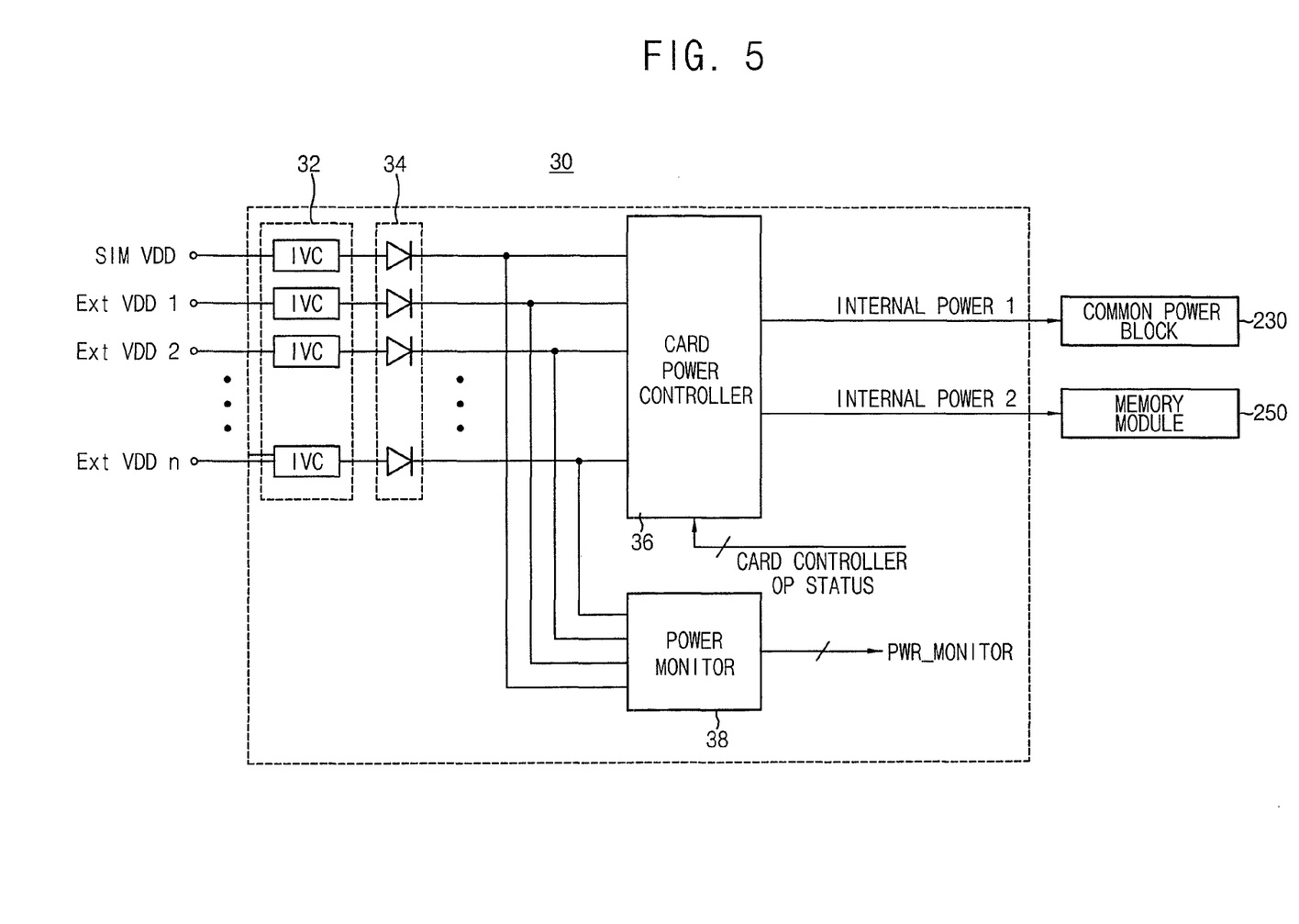
FIG. 5 is a block diagram illustrating a power manager of the card controller shown in FIG. 2 according to an embodiment of the present invention.

FIG. 5 is a block diagram illustrating a power manager of the card controller 230 shown in FIG. 2 according to an example embodiment of the present invention.

Referring to FIG. 5, the power manager 30 includes a plurality of IVCs (Internal Voltage Controllers) 32, a plurality of diodes 34, a card power controller 36 and a power monitor 38.

The power manager 30 manages a power voltage of the card controller 230 to reduce the power consumption, for example, when neither the SIM card host 130 and at least one memory card host 150 provide a power voltage, or when both the SIM card host 130 and at least one memory card host 150 provide a power voltage at the same time.

The IVCs 32 receive external power voltages, such as SIM VDD and Ext VDD 1 through Ext VDD n, and converts the external power voltages' level to a voltage level of the card controller 230 to provide the converted external voltages to the card power controller 36 via the diode 34.

The SIM VDD is a power voltage used for the smart card host 130 (or the SIM card host), and the Ext VDD 1 through the Ext VDD n are power voltages used for the memory card host 150.

The diodes 34 prevent a reverse direction current due to the external power voltages SIM VDD and Ext VDD 1 through Ext VDD n that have different voltage levels from each other.

The card power controller 36 receives the external power voltages SIM VDD and Ext VDD 1 through Ext VDD n to generate a plurality of internal power voltages INTERNAL POWER 1 and a plurality of internal power voltages INTERNAL POWER 2 based on the state information of the card controller 230.

For example, the internal power voltages INTERNAL POWER 1 are used for a main power voltage of the card controller 230, and the internal power voltages INTERNAL POWER 2 are used for a power voltage of the memory module 250.

The power monitor 38 monitors the external power voltages SIM VDD and Ext VDD 1 through Ext VDD n to generate power monitor information PWR_MONITOR.

The power monitor information PWR_MONITOR includes state information of power voltage provided from one host or a plurality of hosts such as the SIM card, the MMC card, the SD card, the Memory Stick® card, the Compact Flash® card, and the Smart Media® card.

Using binary values '1' and '0', the power monitor information PWR_MONITOR represents whether a power voltage is provided from a specific card host or not.

In addition, the power monitor information PWR_MONITOR includes a first state that represents whether a power voltage is being provided from a specific card host or not, a second state that represents whether the power voltage supply process is completed or not, and a third state that represents whether a power voltage of an entire system is cut off or not.

Figure 6:
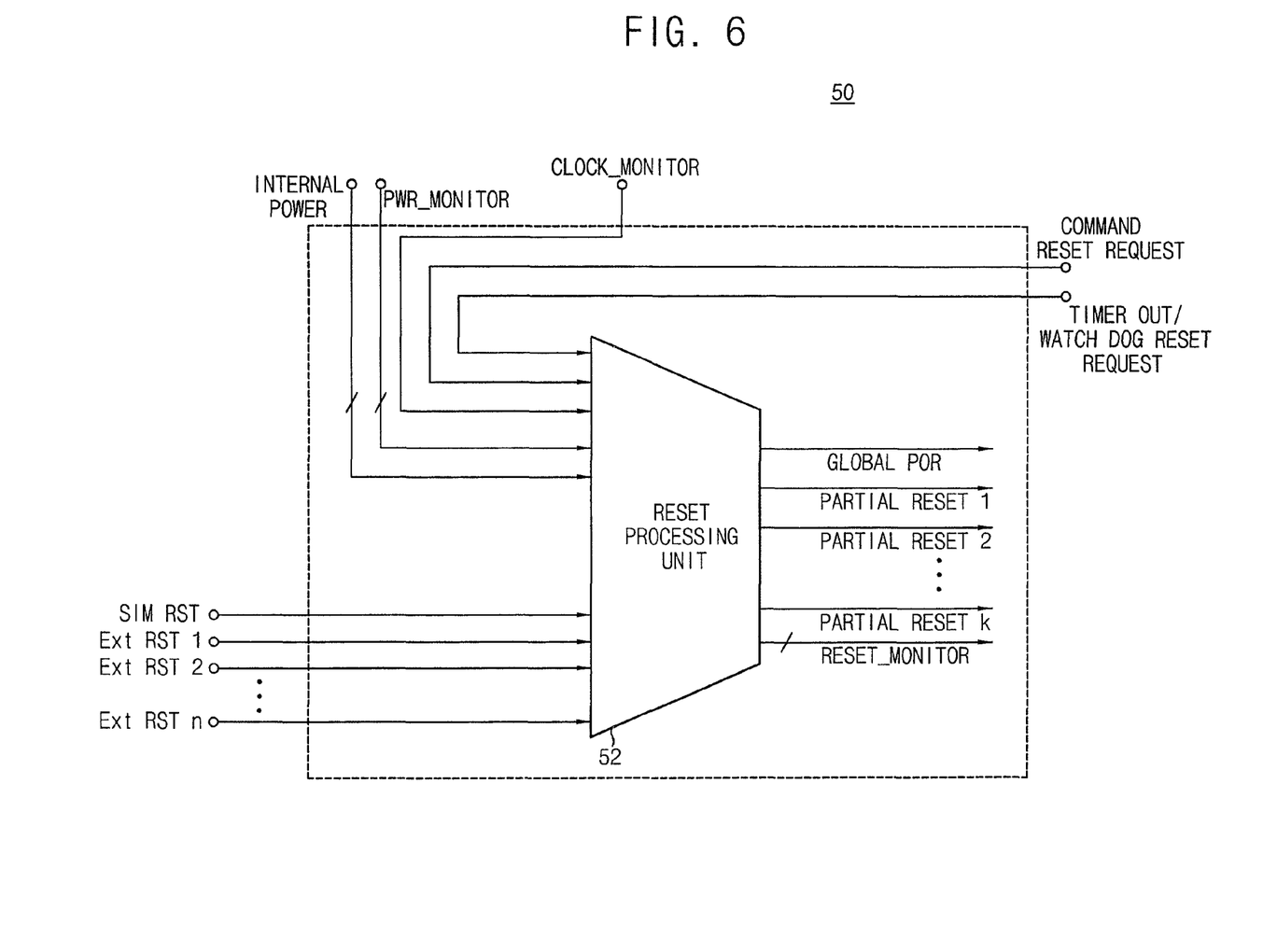
FIG. 6 is a block diagram illustrating a reset manager of the card controller shown in FIG. 2 according to an embodiment of the present invention.

FIG. 6 is a block diagram illustrating a reset manager 50 of the card controller 230 shown in FIG. 2 according to an embodiment of the present invention.

Referring to FIG. 6, the reset manager 50 includes a reset processing unit 52.

Reset signals, such as SIM RST and Ext RST 1 through Ext RST n, are generated from a plurality of hosts, respectively, for example, the SIM card, the MMC card, the SD card, the Memory Stick® card, the Compact Flash® card, and the Smart Media® card.

The SIM RST represents a reset signal generated from the smart card host 130 (or the SIM card host), and the Ext RST 1 through the Ext RST n are generated from the plurality of memory card hosts 150.

The reset manager 50 controls reset operations between the plurality of card hosts so that the generated reset signals may not affect operations of another card host.

The reset processing unit 52 receives the internal power voltages INTER POWER 1 and INTER POWER 2 from the card power controller 36 of the power manager 30 shown in FIG. 5, receives reset signals such as Time Out/Watch Dog Reset Request generated from the card controller 230, receives a reset request command from the plurality of card hosts and receives the reset signals SIM RST and Ext RST 1 through Ext RST n.

The reset processing unit 52 generates a plurality of reset signals, for example, GLOBAL POR signal, a partial RESET 1 through a partial RESET k, and a reset monitor signal RESET_MONITOR, that are used for a reset operation of the multi-interface card 200 based on the power monitor information PWR_MONITOR and the clock monitor information CLOCK_MONITOR.

The reset monitor signal RESET_MONITOR includes information about whether the plurality of card hosts generate reset requests and/or reset signals or not.

In addition, the reset monitor signal RESET_MONITOR includes information about whether a partial reset signal(s) is (are) generated or not.

The reset monitor signal RESET_MONITOR represents a reset state of each card host using the reset signal provided from each card host.

The reset state represents whether the state is before a reset operation, during the reset operation, or after the reset operation.

The GLOBAL POR (Global Power-On-Set) signal is a reset signal for power-on-reset of the entire multi-interface card 200 chip.

Partial Reset 1 through the partial Reset k signals represent reset signals for resetting each block—for example, the SIM card interface block 231 or the memory card interface block 241—of the multi-interface card 200.

The reset signals include the POR (Power-On-Reset) signal, a Cold reset, a Warm reset and internal reset signals, such as the Time Out signal, generated in the card controller 230.

Figure 7:
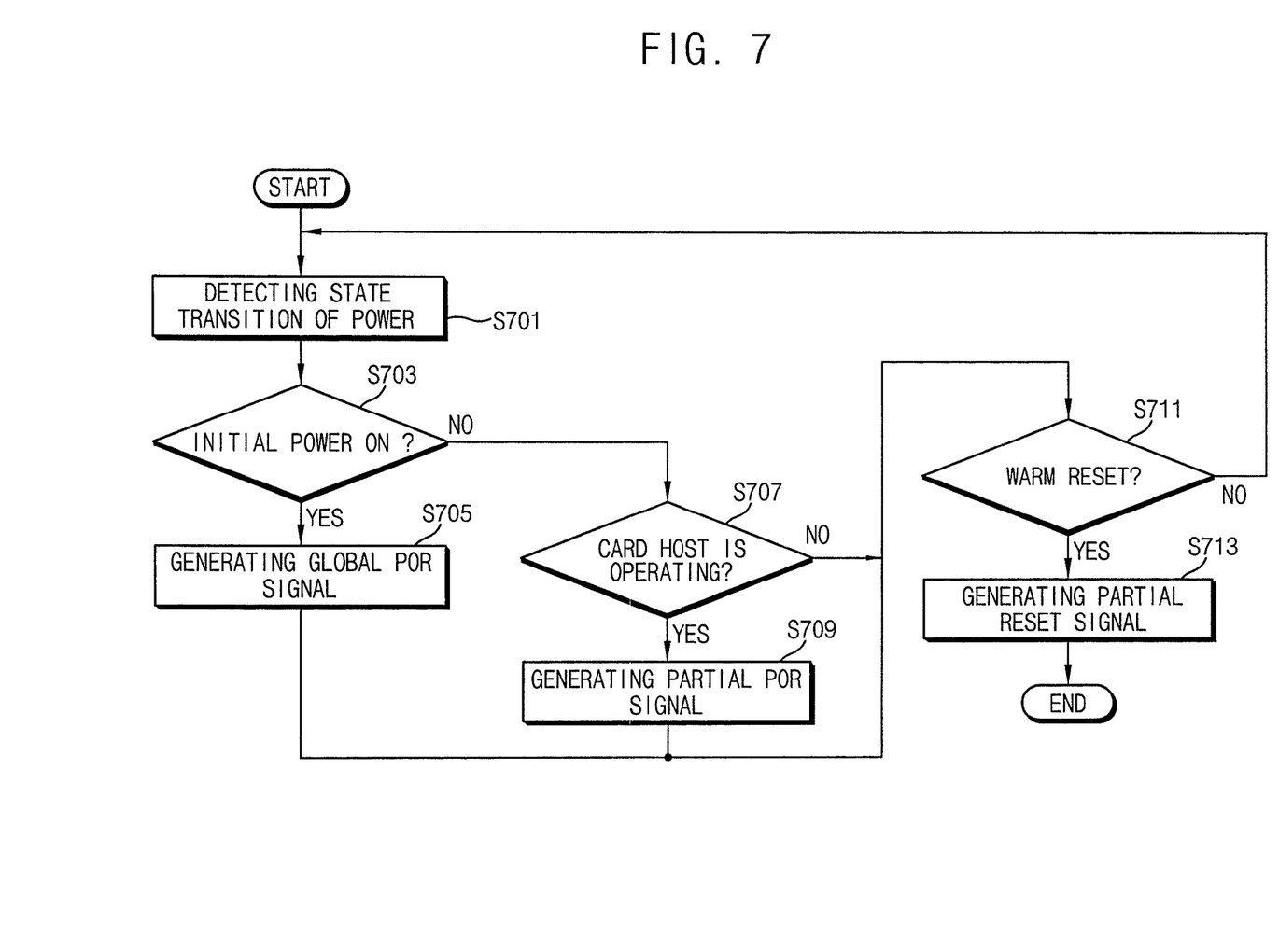
FIG. 7 is a flowchart illustrating operations of the reset manager shown in FIG. 6 according to an embodiment of the present invention.

FIG. 7 is a flowchart illustrating operations of the reset manager 50 shown in FIG. 6 according to an embodiment of the present invention.

Referring to FIG. 7, the reset manager 50 detects state transitions of each power voltage of each card host (block S701).

When a power voltage is activated, the reset manager 50 determines whether the power voltage provided from a card host is an initial power voltage applied to the multi-interface card 200 with reference to the power monitor signal PWR_MONITOR (block S703).

If the power voltage is the initial power voltage applied to the multi-interface card 200, the reset manager 50 generates the GLOBAL POR (Power-On-Reset) signal (block S705).

The reset manager 50 generates the RESET_MONITOR information that represents whether the partial RESET signals are generated or not.

To determine whether the entire system is in a POR status or not, it is determined whether each power voltage of all of the card hosts coupled to the multi-interface card 200 is cut off or not based on the power monitor PWR_MONITOR signal.

When the entire system POR signal is not activated, the reset manager 50 determines whether the corresponding card host providing the reset signal is operating or not with reference to the clock monitor CLOCK_MONITOR signal (block S707).

When the corresponding card host providing the reset signal is operating, the reset manager 50 generates a partial RESET signal to provide the partial RESET signal to the card host interface block corresponding to the card host providing the reset signal (block S709).

The reset manager 50 also detects a warm reset, in which a reset signal is received through a reset pin or a reset request command is received (block S711).

When the warm reset is detected, the reset manager 50 checks which card host provides the reset request command or the reset signal with reference to the power monitor signal PWR_MONITOR.

The reset manager 50 generates the partial RESET signal corresponding to the card host providing the reset request command or the reset signal, and provides the partial RESET signal to the card host interface block corresponding to the card host providing the reset request command or the reset signal (block S713).

Figure 8:
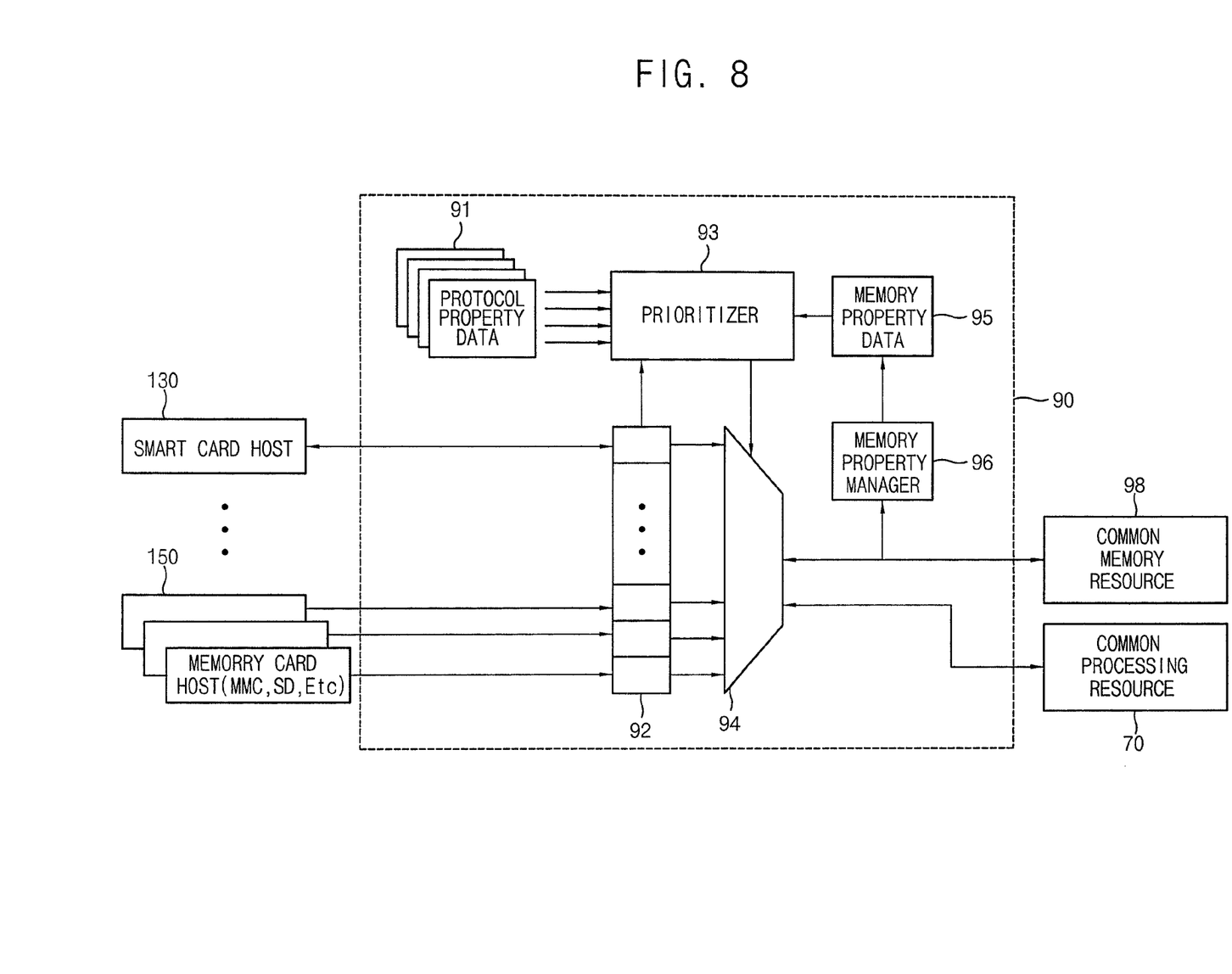
FIG. 8 is a block diagram illustrating a memory/protocol manager according to an embodiment of the present invention.

FIG. 8 is a block diagram illustrating a memory/protocol arbiter 90 according to an embodiment of the present invention.

The memory/protocol arbiter 90 interprets a plurality of requests and a plurality of memory use requests individually or simultaneously provided from the plurality of card hosts, and determines a priority of the plurality of the requests and the plurality of the memory use requests to be suitable for a normal operation defined in a corresponding card protocol specification.

The memory/protocol arbiter 90 provides the plurality of the requests to the common processing resource 70 based on the priority, and provides the plurality of the memory requests to the common memory resource 98.

The plurality of the hosts may include the SIM card host 130 and the memory card host 150—for example, the MMC card host, the SD card host, the Memory Stick® card host, the Compact Flash® card host, and the Smart Media® card host.

The common memory resource 98 includes the memory module 250. Alternately, the common memory resource 98 may include the data memory 237 and the memory module 250.

Referring to FIG. 8, the memory/protocol arbiter 90 includes a wait list 92, a prioritizer 93, a request selector 94, and a memory property manager 96.

The wait list 92 sequentially stores the plurality of requests and the plurality of memory use requests provided from the plurality of card hosts. The wait list 92 may be implemented using a queue.

The prioritizer 93 prioritizes the plurality of the requests and the plurality of the memory use requests based on the protocol property data 91, a status of the wait list 92 and the memory property data 95.

The protocol property data 91 includes information about a normal operation condition depending upon the protocol properties of the plurality of the hosts.

For example, the protocol property data 91 includes a response time needed for the normal operation, a data transfer cycle, a data processing time and a data processing order (or priority) during the normal operation.

The memory property data 95 includes information about a property of the memory area to be accessed.

For example, the memory property data 95 includes information about whether the memory area to be accessed is used for a specific application or not, and about whether the memory area was accessed by another card host or not.

The selector 94 selects a request and a memory request among the plurality of the requests and the plurality of the memory use requests stored in the wait list 92 based on the priority produced by the prioritizer 93, provides the selected requests to the common processing resource 70, and provides the selected memory use requests to the common memory resource 98.

The memory property manager 96 monitors the plurality of the memory use requests to update the memory property data 95 based on the properties of the memory use requests and a memory address to be accessed.

Figure 9:
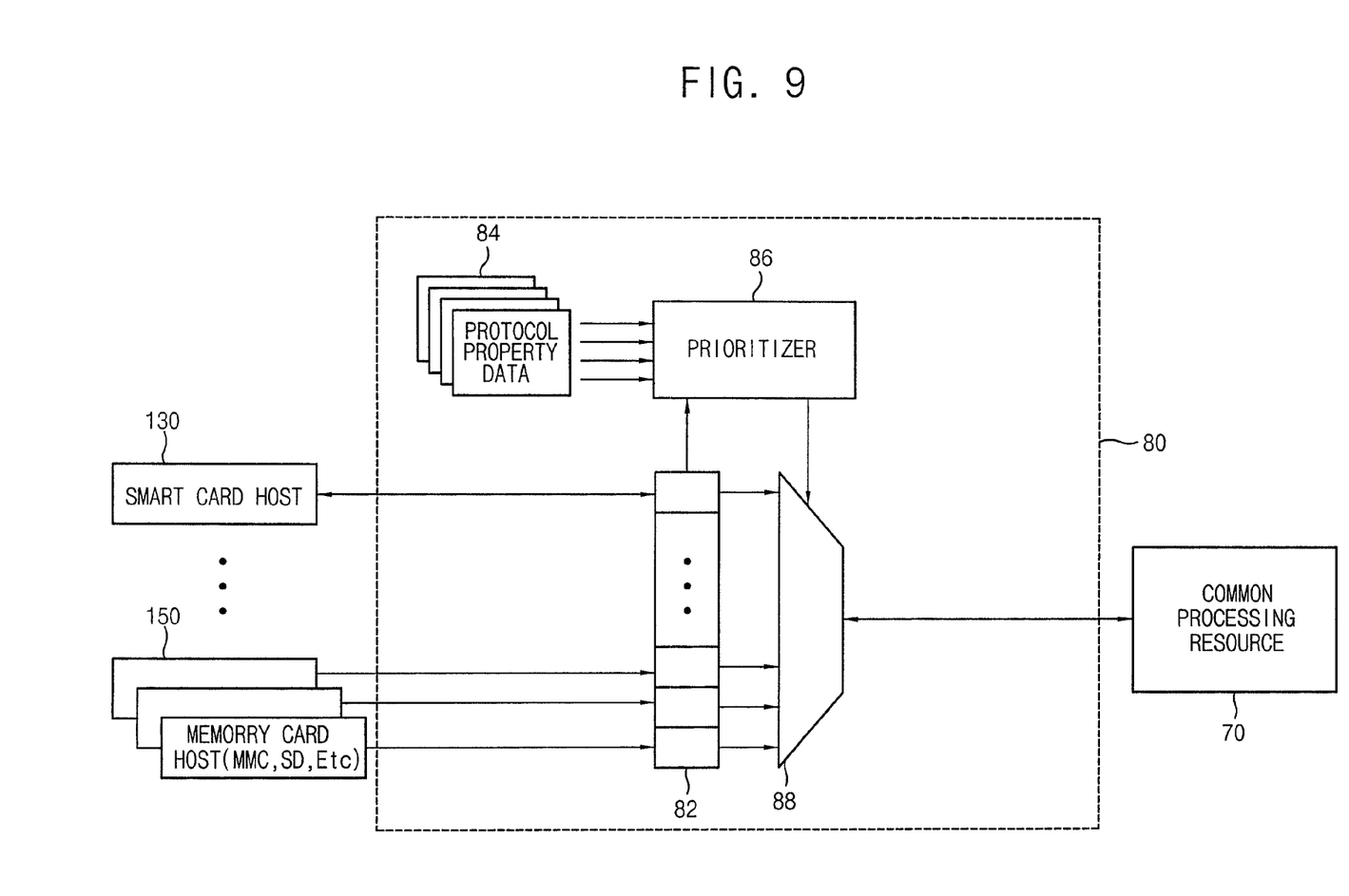
FIG. 9 is a block diagram illustrating a protocol manager according to an embodiment of the present invention.
Figure 10:
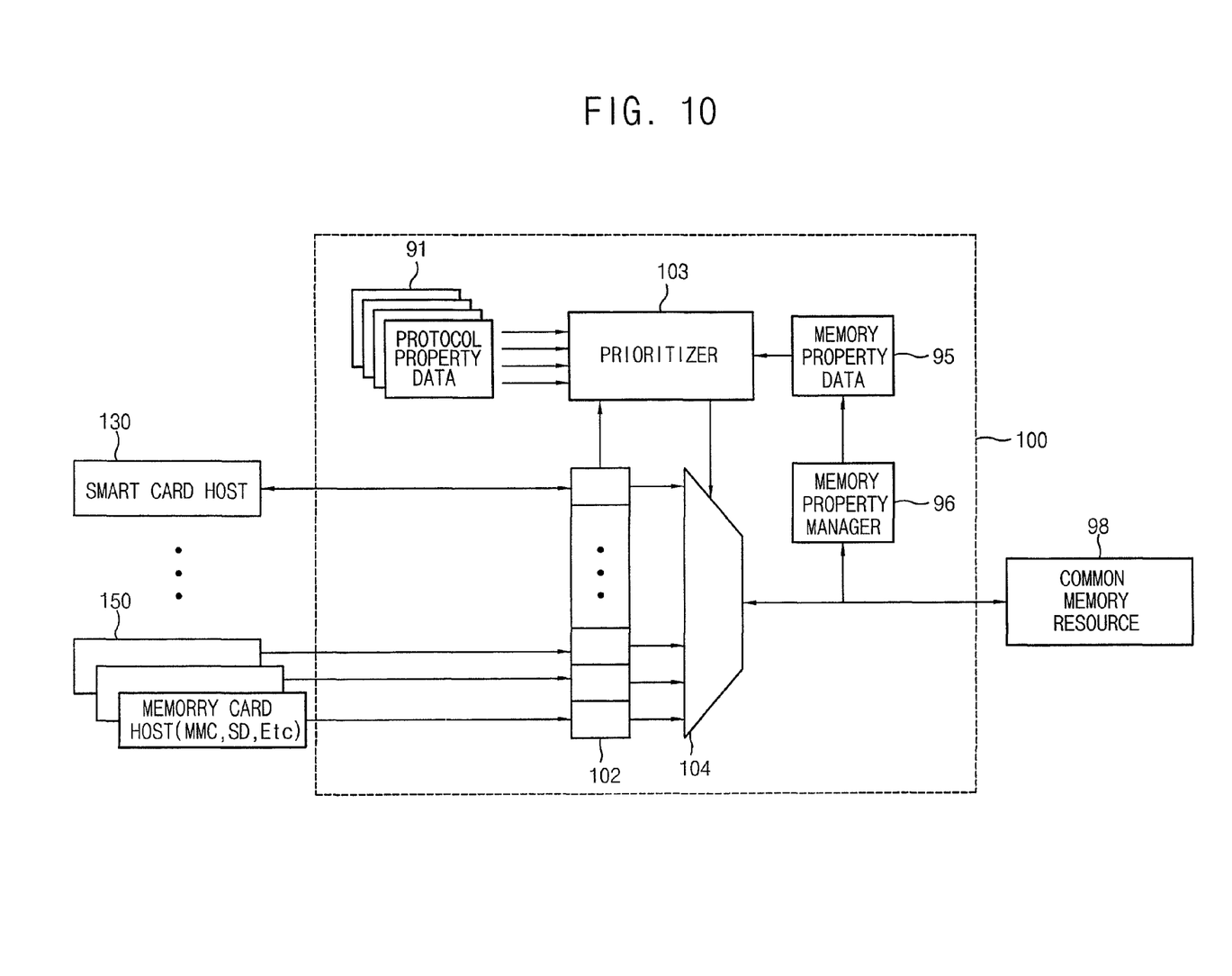
FIG. 10 is a block diagram illustrating a memory control manager according to an embodiment of the present invention.

The memory/protocol arbiter 90 may be implemented using a protocol arbiter 80 of FIG. 9 and a memory control arbiter 100 of FIG. 10.

FIG. 9 is a block diagram illustrating a protocol arbiter according to an embodiment of the present invention.

The protocol arbiter 90 interprets a plurality of requests individually or simultaneously provided from the plurality of card hosts, and prioritizes the plurality of the requests to be suitable for a normal operation defined in a corresponding card protocol specification.

The protocol arbiter 90 provides the plurality of the requests to the common processing resource 70 based on the priority to perform the requests.

Referring to FIG. 9, the protocol arbiter 90 includes a wait list 82, a prioritizer 86 and a selector 88.

The wait list 82 sequentially stores the plurality of requests provided from the plurality of the card hosts.

The wait list 82 may be implemented using a queue.

The prioritizer 86 prioritizes the plurality of the requests based on the protocol property data 84 and a status of the wait list 82.

The selector 88 selects the requests among the plurality of the requests stored in the wait list 82 based on the priority determined by the prioritizer 93, and provides the selected requests to the common processing resource 70.

The common processing resource 70 performs an operation corresponding to the request provided from the selector 88.

FIG. 10 is a block diagram illustrating a memory control arbiter according to an embodiment of the present invention.

The memory control arbiter 100 interprets a plurality of memory use requests individually or simultaneously provided from the plurality of card hosts, and prioritizes the plurality of the memory requests to be suitable for a normal operation defined in a corresponding card protocol specification.

The memory control arbiter 100 provides the plurality of the memory use requests to the common memory resource 98 in the multi-interface card 200.

Referring to FIG. 10, the memory control arbiter 100 includes a wait list 102, a prioritizer 103, a selector 104 and a memory property manager 96.

The wait list 102 sequentially stores the plurality of memory use requests provided from the plurality of the card hosts.

The prioritizer 103 prioritizes the plurality of the memory use requests stored in the wait list 102 based on the protocol property data 91, a status of the wait list 102 and the memory property data 95.

The selector 104 selects one memory use request among the plurality of the memory requests stored in the wait list 102 based on the priority produced by the prioritizer 93, and provides the selected memory use requests to the common memory resource 98.

The memory property manager 96 monitors the memory requests to update the memory property data 95 based on the property of the memory requests and a memory address to be accessed.

According to an embodiment of the present invention, a multi-interface card can support, simultaneously, the SIM card interface and the memory card interface, for example, when the SIM card and the at least one memory card are not separately mounted on the mobile phone manage the multimedia card system. Thus, the one multi-interface card can support subscriber's authentication function and the data storage function.

In addition, the manufacture cost of the mobile phone may be reduced, and a decreased area occupied by the SIM card and the memory cart in the mobile phone may be achieved.

In addition, the clock of the smart card host and the clock of the memory card host are monitored, and the system clock rate may be changed into a low clock rate or a high clock rate based on the operation mode, e.g., a sleeping mode, a normal mode and a stop mode. Thus, the power consumption of the multi-interface card system may be reduced.

In addition, the multi-interface card monitors a plurality of clocks, power signals and reset signals which are simultaneously or separately received from a plurality of card hosts, and manages clocks and power signals that are provided to the smart card interface and the memory card interface. Thus, the power consumption of the multi-interface card system may be reduced.

While embodiments of the present invention have been described in detail, it should be understood that various changes, substitutions and alterations may be made herein without departing from the scope of the invention.

What is claimed is:

1. A multi-interface card control module comprising:
    a smart card interface configured to interface with a smart card host using a smart card protocol to perform an authentication operation;
    a memory card interface configured to interface with at least one memory card host using a memory card protocol; and
    a card controller configured to control the smart card interface and the memory card interface to simultaneously interface with the smart card host and the at least one memory card host.

2. The multi-interface card control module of claim 1, wherein the smart card host and the at least one memory card host are installed in a portable device.

3. The multi-interface card control module of claim 1, wherein the smart card host operates at a first clock rate of a first clock signal and a first power voltage, and the at least one memory card host operates at a second clock rate of a second clock signal and a second power voltage, and wherein the card controller simultaneously supports the smart card host and the at least one memory card host by selecting a system clock signal based on the first clock signal and the second clock signal and selecting at least one internal power voltage of the card controller based on the first power voltage and the second power voltage in response to a predetermined state transition.

4. The multi-interface card control module of claim 3, wherein the predetermined state transition is established when the first clock signal of the smart card host and the second clock signal of the at least one memory card host are simultaneously applied, when at least one clock of the first clock and the second clock is cut off, or when the first clock signal or the second clock signal is applied.

5. The multi-interface card control module of claim 1, wherein the card controller provides an internal clock signal as a system clock signal, and wherein the internal clock signal has a relatively high clock rate among clock rates of a first clock signal from the smart card host and a second clock signal from the at least one memory card host when the first clock signal and the second clock signal are simultaneously activated.

6. The multi-interface card control module of claim 1, wherein the card controller comprises a protocol manager configured to prioritize a plurality of requests received from the at least one memory card host and the smart card host.

7. The multi-interface card control module of claim 6, wherein the protocol manager interprets the plurality of requests of the at least memory card host and the smart card host using a token interpreter, and prioritizes the requests based on response times for operations defined in the smart card protocol and the memory card protocol.

8. The multi-interface card control module of claim 1, wherein the card controller comprises a memory control manager configured to prioritize a plurality of memory use requests for a memory module.

9. The multi-interface card control module of claim 8, wherein the memory control manager interprets the plurality of memory use requests generated from the smart card host and the at least memory card host using a token interpreter, and prioritizes the memory use requests based on response times for operations defined in the smart card protocol and the memory card protocol.

10. The multi-interface card control module of claim 1, wherein the card controller comprises a clock manager configured to select at least one internal clock signal as a system clock signal based on a clock control signal, and configured to provide a first clock signal of the smart card host to the smart card interface and a second clock signal of the at least one memory card host to the memory card interface based on the clock control signal.

11. The multi-interface card control module of claim 10, wherein the clock manager comprises a clock detector configured to monitor each state of the first clock signal and the second clock signal to generate a clock monitor signal representing whether each of the first clock signal and the second clock signal are activated or deactivated.

12. The multi-interface card control module of claim 11, wherein the clock manager further comprises:
an internal clock selector configured to select one clock signal of the at least one internal clock signal in response to the clock control signal;
a system clock selector configured to select one clock signal as the system clock signal among the selected internal clock signal, the first clock signal and the second clock signal in response to the clock control signal;
a smart card clock selector configured to select the first clock signal in response to the clock control signal to provide the selected first clock signal to the smart card interface; and
a memory card clock selector configured to select the second clock signal in response to the clock control signal to provide the selected second clock signal to the memory card interface.

13. The multi-interface card control module of claim 1, wherein the card controller comprises a power manager configured to monitor a first power voltage of the smart card host and a second power voltage of the at least one memory card host to control an internal power voltage.

14. The multi-interface card control module of claim 13, wherein the power manager comprises:
a voltage controller configured to change each of voltage levels of the first power voltage and the second power voltage;
a card power controller configured to generate a common power voltage and a third power voltage for a memory module using a changed first power voltage and a changed second power voltage; and
a power monitor configured to monitor each of power states of the first power voltage and the second power voltage to generate power monitor information including power states of the first power voltage and the second power voltage.

15. The multi-interface card control module of claim 1, wherein the card controller comprises a reset manager configured to control reset operations of the smart card host and the at least one memory card host based on a clock monitor signal and a power monitor signal.

16. A multi-interface card control module comprising:
a first card interface configured to interface with a first card host having an authentication function;
a second card interface configured to simultaneously interface with at least one second card host having a data storage function; and
a card controller configured to monitor signals received from the first card host and the at least one of the second card host, and configured to control the received signals.

17. The multi-interface card control module of claim 16, wherein the received signals include clock signals, power signals, reset signals, data signals and request signals of the first card host and the at least one second card host.

18. The multi-interface card control module of claim 16, wherein the first card host is a smart card host, and the at least one second card host is at least one memory card host.

19. A multi-interface card comprising:
a multi-interface card control module configured to interface with a smart card host using a smart card protocol to perform an authentication operation, and configured to simultaneously interface with at least one memory card host using a memory card protocol; and
a memory module configured to store data transferred from the smart card host and the at least one memory card host.

20. The multi-interface card of claim 19, wherein the memory module include a nonvolatile memory.

* * * * *